(12) United States Patent
Lin et al.

(10) Patent No.: US 12,199,672 B2
(45) Date of Patent: Jan. 14, 2025

(54) WAVELENGTH DIVISION MULTIPLEXER/DEMULTIPLEXER, PHOTONIC INTEGRATED CHIP, AND OPTICAL MODULE

(71) Applicant: InnoLight Technology (Suzhou) Ltd., Suzhou (CN)

(72) Inventors: Tianhua Lin, Jiangsu (CN); Defen Guo, Jiangsu (CN); Xianyao Li, Jiangsu (CN)

(73) Assignee: InnoLight Technology (Suzhou) Ltd., Suzhou (CN)

( * ) Notice: Subject to any disclaimer, the term of this patent is extended or adjusted under 35 U.S.C. 154(b) by 178 days.

(21) Appl. No.: 18/186,941

(22) Filed: Mar. 20, 2023

(65) Prior Publication Data

US 2023/0224040 A1    Jul. 13, 2023

Related U.S. Application Data

(63) Continuation of application No. PCT/CN2021/110324, filed on Aug. 3, 2021.

(30) Foreign Application Priority Data

Sep. 27, 2020 (CN) .......................... 202022148253.7

(51) Int. Cl.
*H04B 10/00* (2013.01)
*H04B 10/2519* (2013.01)
(Continued)

(52) U.S. Cl.
CPC ..... *H04B 10/2519* (2013.01); *H04B 10/2581* (2013.01); *H04J 14/0215* (2013.01); *H04J 14/0307* (2023.08)

(58) Field of Classification Search
CPC .............. H04J 14/0201; H04J 14/0202; H04J 14/0209; H04Q 2011/0022; G02B 6/12007

See application file for complete search history.

(56) References Cited

U.S. PATENT DOCUMENTS 11,002,980 B1 *   5/2021   Ling ................... G02B 27/4272
11,249,246 B2 *   2/2022   Ling ....................... H04J 14/00

FOREIGN PATENT DOCUMENTS

CN    109870767 A       6/2019
CN    109870767 B   *   8/2020

OTHER PUBLICATIONS

International Search Report issued on Nov. 9, 2021 for PCT application No. PCT/CN2021/110324.

* cited by examiner

*Primary Examiner* — Daniel G Dobson
(74) *Attorney, Agent, or Firm* — Li & Cai Intellectual Property Office

(57) ABSTRACT

A wavelength division multiplexer/demultiplexer, a photonic integrated chip, and an optical module are provided. The wavelength division multiplexer/demultiplexer includes a substrate, a bus waveguide provided on the substrate, and at least two wavelength division multiplexing/demultiplexing units provided on the bus waveguide. Each of the at least two wavelength division multiplexing/demultiplexing units includes a mode multiplexer and an asymmetric Bragg grating. The mode multiplexer includes a first port, a second port, and a third port. The third port is connected to the asymmetric Bragg grating, so as to input a light in a TE1 mode or a higher-order mode to the asymmetric Bragg grating. The asymmetric Bragg grating transmits light containing wavelengths other than a wavelength $\lambda i$. A grating (Continued)

period of the asymmetric Bragg grating and the wavelength $\lambda i$ satisfy a resonance condition.

13 Claims, 11 Drawing Sheets

(51) Int. Cl.
  *H04B 10/2581* (2013.01)
  *H04J 14/02* (2006.01)
  *H04J 14/00* (2006.01)

WAVELENGTH DIVISION MULTIPLEXER/DEMULTIPLEXER, PHOTONIC INTEGRATED CHIP, AND OPTICAL MODULE

CROSS-REFERENCE TO RELATED PATENT APPLICATION

This application is a continuation application of International Patent Application Ser. No. PCT/CN2021/110324, filed on Aug. 3, 2021, which the international application was published on Mar. 31, 2022, as International Publication No. WO 2022/062676A1, and claims the priority of China Patent Application No. CN202022148253.7, filed on Sep. 27, 2020 in People's Republic of China. The entirety of each of the above patent applications is hereby incorporated by reference herein and made a part of this specification.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a technology in the field of optical communication, and more particularly to a wavelength division multiplexer/demultiplexer, a photonic integrated chip, and an optical module.

BACKGROUND OF THE DISCLOSURE

With the continuous development of the information society, the demand for capacity and bandwidth of optical transmission is increasing exponentially, and the demand for large-capacity optical interconnection is also growing rapidly. It is well-known that the wavelength division multiplexing (WDM) technology is an effective means to increase the capacity of optical communication. In addition, the WDM technology is combined with the photonic integrated chip technology, so as to effectively reduce the size of a device and improve integration of a system. With regard to a dense wavelength division multiplexing (DWDM) system having narrow channel spacing (e.g., 0.8 nm), the main difficulty of such a system is that it's very sensitive to a tiny wavelength shift of laser sources or DWDM filters. For example, the wavelength shift caused by the change of an ambient temperature is usually unfavorable to DWDM on a silicon-base, so that a DWDM device based on the silicon-base generally requires the addition of complex and expensive wavelength tuning and trimming structures.

On the other hand, the coarse wavelength division multiplexing (CWDM) technology has become a preferred choice due to its large channel spacing (e.g., 20 nm). As the increased channel spacing, it is insensitive to the wavelength shift, which can greatly reduce requirements for wavelength control of lasers and WDM filters. As a result, the CWDM technology has become popular in short-reach optical interconnects (such as data centers). Common structure types of CWDM devices include arrayed waveguide gratings (AWG), etched diffraction gratings, and Bragg gratings. A CWDM filter based on AWG/etched diffraction grating can provide low crosstalk, but has disadvantages of having an uneven top of a spectrum and large additional loss. A CWDM filter based on Bragg grating has low additional loss (<1 dB) and a large 1 dB bandwidth, but has high crosstalk.

China Patent Application No. CN201710257373.0 filed under the title of "Filter Based on Axial Apodized Grating" discloses a filter that uses asymmetric gradient directional couplers and an antisymmetric multimode waveguide grating which are cascaded, in which the antisymmetric multimode waveguide grating embodies apodization through gradual distribution of axial positions of grating teeth on both sides, and has advantages of a large tolerance and a large side mode suppression ratio. However, when the filter is employed as a multi-wavelength wavelength division multiplexer, in order to reduce crosstalk of adjacent channels within an application range of the wavelength division multiplexer (e.g., 1261 nm to 1341 nm range of CWDM4), an effective refractive index difference between a TE0 mode and a TE1 mode transmitted in the antisymmetric multimode waveguide grating needs to be large enough (e.g., greater than 0.35). Basically, this can only be satisfied by a strip waveguide on a silicon-on-insulator (SOI) structure, and such requirement is severe.

SUMMARY OF THE DISCLOSURE

In response to the above-referenced technical inadequacies, the present disclosure provides a wavelength division multiplexer/demultiplexer based on asymmetric Bragg gratings that can improve channel crosstalk, is suitable for waveguides of various semiconductor materials, and has advantages of low loss, a high extinction ratio, high efficiency, and a large bandwidth.

In order to solve the above-mentioned problems, one of the technical aspects adopted by the present disclosure is to provide a wavelength division multiplexer/demultiplexer based on asymmetric Bragg gratings, which includes: a substrate, a bus waveguide provided on the substrate, and at least two wavelength division multiplexing/demultiplexing units provided on the bus waveguide.

Each of the wavelength division multiplexing/demultiplexing units includes a mode multiplexer and an asymmetric Bragg grating. The mode multiplexer is configured to make an input light incident into the asymmetric Bragg grating in a TE1 mode or a higher-order mode. The mode multiplexer includes a first port, a second port and a third port. The first port and the second port are configured to input or output optical signals, respectively, and the third port is connected to the asymmetric Bragg grating. The asymmetric Bragg gratings in different units of the at least two wavelength division multiplexing/demultiplexing units have different grating periods.

When the wavelength division multiplexer/demultiplexer based on asymmetric Bragg gratings is employed as a demultiplexer, a light containing multiple wavelengths input from one of the first port and the second port of the mode multiplexer is incident into the asymmetric Bragg grating through a light in a TE(n+1) mode output from the third port by the mode multiplexer, the asymmetric Bragg grating reflects a light with a resonant wavelength $\lambda i$ that satisfies a resonance condition with its grating period, and converts the reflected light with the resonant wavelength $\lambda i$ into the TE0 mode and transmits the reflected light to the mode multiplexer, and the reflected light is output from another of the first port and the second port. The asymmetric Bragg grating transmits a light containing other wavelengths except the resonance wavelength λi, and n is an integer greater than or equal to zero.

In order to solve the above-mentioned problems, another one of the technical aspects adopted by the present disclosure is to provide a photonic integrated chip. The above-mentioned wavelength division multiplexer/demultiplexer based on asymmetric Bragg gratings is disposed in the photonic integrated chip.

In order to solve the above-mentioned problems, yet another one of the technical aspects adopted by the present disclosure is to provide an optical module. The optical module includes the above-mentioned wavelength division multiplexer/demultiplexer based on asymmetric Bragg gratings.

Therefore, in the wavelength division multiplexer/demultiplexer, the photonic integrated chip, and the optical module provided by the present disclosure, a combination method of the mode multiplexer and the asymmetric Bragg grating is improved, to make no TE0 mode reflections (at wavelengths that are greater than the resonance wavelength) in the asymmetric Bragg grating, so that there is no reflection peak at long wavelengths in the TE0 mode. Accordingly, in the present disclosure, wavelength crosstalk of other modes can be effectively prevented, and no requirement is imposed on an effective refractive index difference between the TE0 mode and the TE1 mode. This allows the wavelength division multiplexer/demultiplexer on a waveguide structure of various semiconductor materials to meet requirements of CWDM and to have a wide range of applications.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
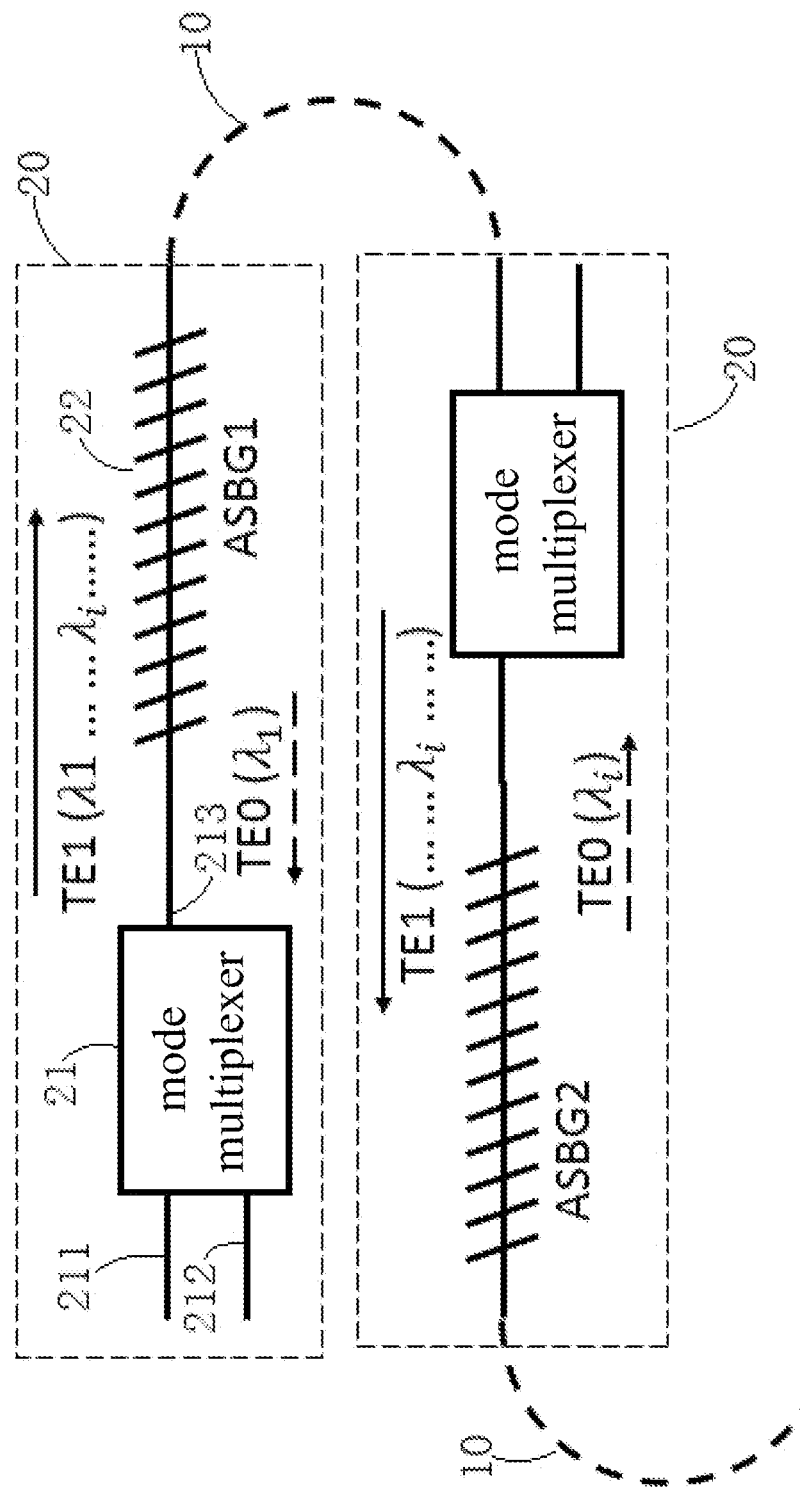
FIG. 1 is a schematic diagram of a wavelength division multiplexer/demultiplexer based on asymmetric Bragg gratings of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In the drawings of the present disclosure, the sizes of certain structures or portions may be enlarged relative to other structures or portions for illustrative purposes, and thus are merely used for illustration of the basic structure of the subject matter of the present disclosure.

In addition, spatially relative terms (such as "over," "above," "under," and "below") in the present disclosure are used to conveniently describe a spatial relationship between one element/feature and another element/feature as shown in the drawings. These spatially relative terms are intended to include different orientations of a device in use or in operation other than the orientations illustrated in the drawings. For example, when the device in the drawing is turned over, elements described as below and/or under other elements or features would then be oriented above the other elements or features. Therefore, the exemplary term "below" encompasses both orientations of "above" and "below". The device may also be otherwise oriented (rotated 90 degrees or at other orientations), and the spatially relative terms used herein is to be interpreted accordingly. When one element/layer is referred to as being disposed "above" or "connected to" another element/layer, said element/layer can be directly disposed above or connected to another element/layer, or a middle element/layer can be provided therebetween.

Figure 2:
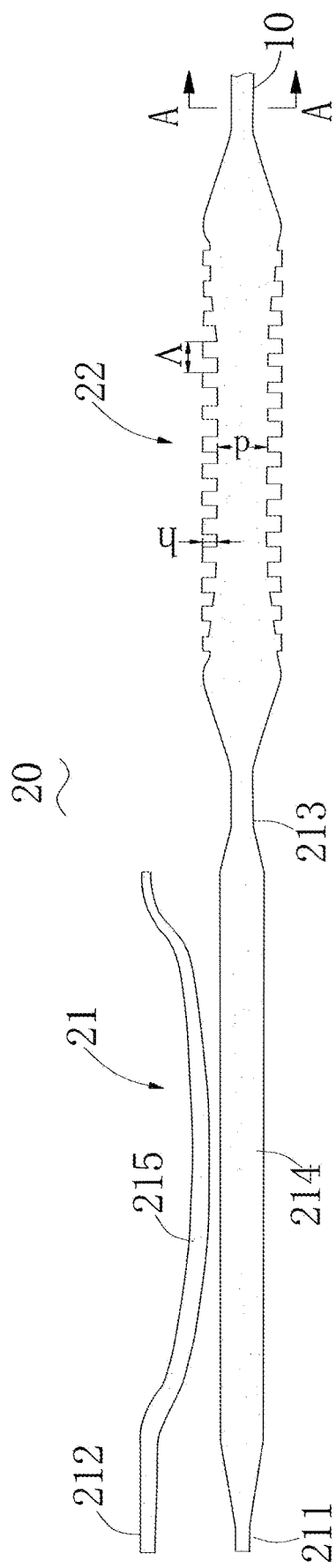
FIG. 2 is a schematic structural view of a single wavelength division multiplexing/demultiplexing unit of the present disclosure.
Figure 3:
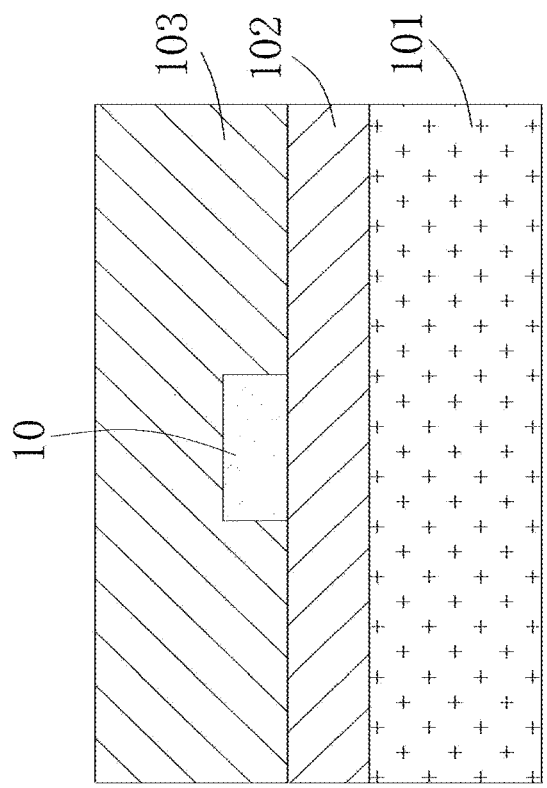
FIG. 3 is a schematic cross-sectional view taken along line A-A of FIG. 2.

As shown in FIG. 1, the present disclosure provides a wavelength division multiplexer/demultiplexer based on asymmetric Bragg gratings, which includes a substrate, a bus waveguide 10 provided on the substrate, and at least two wavelength division multiplexing/demultiplexing units 20 provided on the bus waveguide 10. Reference is made to FIG. 2, which is a schematic structural diagram of one of the wavelength division multiplexing/demultiplexing units 20. In this diagram, structures such as the substrate and covering layers are omitted, and only the bus waveguide 10 and structures of other components are shown. FIG. 3 is a sectional schematic diagram of A-A in FIG. 2. Here, the wavelength division multiplexer/demultiplexer is provided on a planar waveguide of a silicon-on-insulator (SOI) structure, and includes a substrate 101, a buried oxide layer 102, the bus waveguide 10, and a cover layer 103. The substrate 101 is a silicon substrate, the buried oxide layer 102 is silicon dioxide, the bus waveguide 10 is a strip waveguide made of a silicon material, and the cover layer 103 is silicon dioxide. In other embodiments, the bus waveguide 10 can be a ridge waveguide or a waveguide of other materials, such as silicon nitride (SiN), silicon oxynitride (SiON), silicon oxide ($SiO_2$), indium phosphide (InP), gallium nitride (GaN), or lithium niobate ($LiNbO_3$). Alternatively, the wavelength division multiplexer/demultiplexer can be provided on a planar waveguide based on other structures, and the substrate can be a substrate made of other materials, such as a lithium niobate substrate, an indium phosphide substrate, or a gallium nitride substrate.

The wavelength division multiplexing/demultiplexing unit 20 includes a mode multiplexer 21 and an asymmetric Bragg grating 22. The mode multiplexer 21 is configured to make an input light incident into the asymmetric Bragg grating 22 in a TE1 mode or a higher-order mode. The mode multiplexer 21 includes a first port 211, a second port 212 and a third port 213. The first port 211 and the second port 212 are respectively configured to input or output optical signals, and the third port 213 is connected to the asymmetric Bragg grating 22. The asymmetric Bragg gratings 22 in different units of the at least two wavelength division multiplexing/demultiplexing units 20 have different grating periods, and a light that satisfies a resonance condition with the grating period of the asymmetric Bragg grating 22 has a resonant wavelength $\lambda i$. The resonance condition is $$2\pi/\Lambda = \left(\frac{2\pi}{\lambda i}\right) n\_TE0 + \left(\frac{2\pi}{\lambda i}\right) n\_TE1,$$

in which $\Lambda$ is a period of a corresponding asymmetric Bragg grating, $\lambda i$ is a wavelength of a transmitted light, and $n_{TE0}$ and $n_{TE1}$ are respectively the effective refractive indices of a light when being transmitted in the corresponding asymmetric Bragg grating in the TE0 mode and in the TE1 mode.

In the embodiment, as shown in FIG. 2, the mode multiplexer 21 includes a straight-through waveguide 214 and a cross waveguide 215. Two ends of the straight-through waveguide 214 are respectively the first port 211 and the third port 213, and an end of the cross waveguide 215 that is adjacent to the first port end 211 is the second port 212.

The cross waveguide 215 and the through waveguide 214 perform mode coupling. In other embodiments, the mode multiplexer may also adopt other mode multiplexing structures. The asymmetric Bragg grating 22 has a grating structure that is gradually asymmetrical, an etching depth h of the grating is gradually increased from both ends of the grating toward the middle, and a waveguide width d in the center of the grating gradually narrows from both ends toward the middle, so as to form a certain taper.

When the wavelength division multiplexer/demultiplexer is employed as a demultiplexer, a light containing multiple wavelengths input from one of the first port 211 and the second port 212 of the mode multiplexer 21 is incident into the asymmetric Bragg grating 22 through a light in a TE(n+1) mode output from the third port 213 by the mode multiplexer 21. The asymmetric Bragg grating 22 reflects a light with a resonant wavelength $\lambda i$, its grating period satisfies a resonance condition with the resonant wavelength $\lambda i$, and converts the reflected light with the resonant wavelength $\lambda i$ into the TE0 mode and transmits the reflected light to the mode multiplexer 21, and the reflected light is output from another of the first port 211 and the second port 212. The asymmetric Bragg grating 22 transmits lights containing wavelengths corresponding to other communication channels (but not the above-mentioned light with the resonant wavelength $\lambda i$). Here, another one of the first port 211 and the second port 212 corresponds to the above-mentioned one of the first port 211 and the second port 212 which is configured to input the optical signals. In the TE0 and TE(n+1) modes, n is an integer greater than or equal to zero. For the convenience of description, the explanation below takes n=0 as an example. That is, the transmission in the asymmetric Bragg grating is exemplified as being the TE1 mode. In other embodiments, the transmission in the asymmetric Bragg grating can be carried out in a mode higher than the TE1 mode (e.g., TE2).

Figure 4:
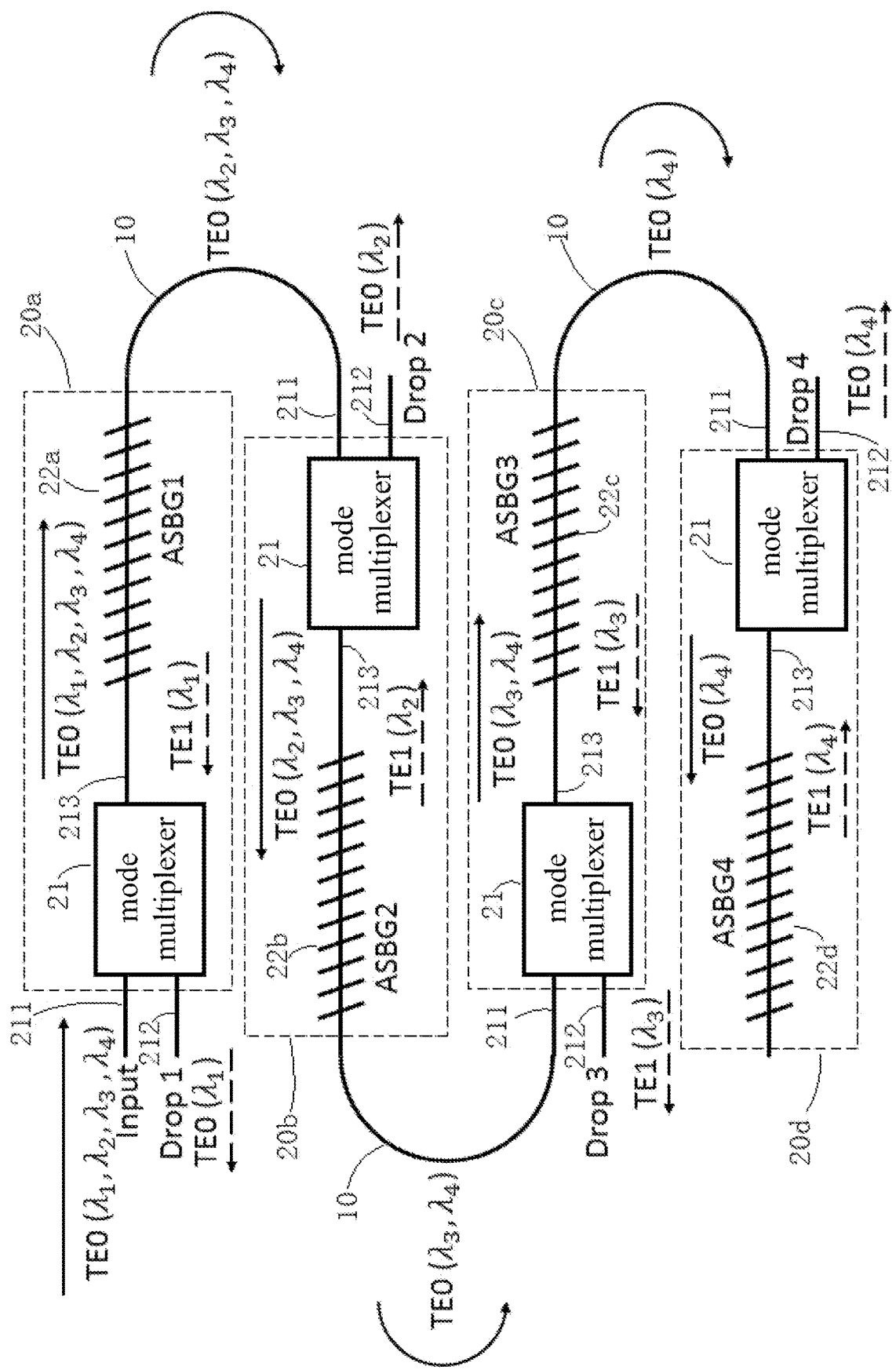
FIG. 4 is a schematic structural diagram of a four-channel wavelength division multiplexer/demultiplexer according to one embodiment of the present disclosure.

Wavelength division multiplexing/demultiplexing of four wavelengths that range from 1261 nm to 1341 nm as required by CWDM4 (which is commonly used in light communications) is taken as an example. Assuming that the four wavelengths are $\lambda 1$, $\lambda 2$, $\lambda 3$, and $\lambda 4$, at least three wavelength division multiplexing/demultiplexing units are needed for cascading. FIG. 4 is a schematic structural diagram of the wavelength division multiplexer/demultiplexer according to an embodiment of the present disclosure. The wavelength division multiplexer/demultiplexer includes a first wavelength division multiplexing/demultiplexing unit 20a, a second wavelength division multiplexing/demultiplexing unit 20b, a third wavelength division multiplexing/demultiplexing unit 20c, and a fourth wavelength division multiplexing/demultiplexing unit 20d that are cascaded. The asymmetric Bragg gratings corresponding to the four wavelength division multiplexing/demultiplexing units are a first asymmetric Bragg grating 22a, a second asymmetric Bragg grating 22b, a third asymmetric Bragg grating 22c, and a fourth asymmetric Bragg grating 22d, respectively. The demultiplexer is taken as an example. The first port 211 of the mode multiplexer 21 is an input port Input, the second port 212 is an output port Drop 1, and the third port 213 is connected to an incident end of the asymmetric Bragg grating 22a. A transmission end of the asymmetric Bragg grating 22a is connected to the first port 211 of the mode multiplexer 21 at a next stage. Here, the mode multiplexer 21 is designed in such a manner that the light in the TE0 mode that is input to the mode multiplexer from the first port 211 will be directly transmitted through the straight-through waveguide and output from the third port 213, and the light in the TE1 mode that is input to the mode multiplexer from the third port 213 will be mode-coupled to the cross waveguide and output from the second port 212 in the TE0 mode.

For the wavelength division multiplexer/demultiplexer shown in FIG. 4, a demultiplexing process is as follows. A composite light containing the four wavelengths λ1, λ2, λ3 and λ4 in the TE0 mode is input to the mode multiplexer 21 of the first wavelength division multiplexing/demultiplexing unit 20a from the first port 211, is transmitted through the straight-through waveguide of the mode multiplexer 21 and output from the third port 213, and is incident into the first asymmetric Bragg grating 22a of the first wavelength division multiplexing/demultiplexing unit 20a. The first asymmetric Bragg grating 22a is designed to transmit the lights containing the wavelengths λ2, λ3, λ4, and to reflect the light with the wavelength λ1 and perform a mode conversion to convert the mode of the light reflected. The light with the wavelength λ1 is reflected by the first asymmetric Bragg grating 22a and converted into the TE1 mode, is transmitted to the third port 213 of the mode multiplexer 21, and then is converted into the TE0 mode and output from the second port 212 after being mode coupled from the straight-through waveguide to the cross waveguide in the mode multiplexer 21. The lights containing the wavelengths λ2, λ3, λ4 are transmitted through the first asymmetric Bragg grating 22a, and then are transmitted to the wavelength division multiplexing/demultiplexing unit at a next stage (i.e., the second wavelength division multiplexing/demultiplexing unit 20b) along the bus waveguide 10 in the TE0 mode. That is, the lights containing the wavelengths λ2, λ3, λ4 are input to the first port 211 of the mode multiplexer 21 of the second wavelength division multiplexing/demultiplexing unit 20b. The second asymmetric Bragg grating 22b of the second wavelength division multiplexing/demultiplexing unit 20b is designed to transmit the lights containing the wavelengths λ3, λ4, and to reflect the light with the wavelength λ2 and perform the mode conversion to convert the mode of the light reflected. The demultiplexing process of the second wavelength division multiplexing/demultiplexing unit 20b is the same as that of a previous stage (i.e., the first wavelength division multiplexing/demultiplexing unit 20a). The light with the wavelength λ2 in the TE0 mode is output from the second port 212 of the mode multiplexer 21 of the second wavelength division multiplexing/demultiplexing unit 20b, and the lights containing the wavelengths λ3, λ4 continue to be transmitted to the wavelength division multiplexing/demultiplexing unit at a next stage (i.e., the third wavelength division multiplexing/demultiplexing unit 20c) along the bus waveguide 10 in the TE0 mode. At this stage, the third asymmetric Bragg grating 22c is designed to transmit the light with the wavelength λ4, and to reflect the light with the wavelength λ3 and perform the mode conversion to convert the mode of the light reflected. Afterwards, the light with the wavelength λ3 in the TE0 mode is output from the second port 212 of the mode multiplexer 21 of the third wavelength division multiplexing/demultiplexing unit 20c, and then the light with the wavelength λ4 is transmitted through the third asymmetric Bragg grating and output in the TE0 mode. The light with the wavelength λ4 in the TE0 mode transmitted through the third asymmetric Bragg grating 22c continues to be transmitted to the fourth wavelength division multiplexing/demultiplexing unit 20d along the bus waveguide 10. The fourth asymmetric Bragg grating 22d of the fourth wavelength division multiplexing/demultiplexing unit 20d is designed to reflect the light with the wavelength λ4 and perform the mode conversion to convert the mode of the light reflected. Finally, the light with the wavelength λ4 in the TE0 mode is output from the second port 212 of the mode multiplexer 21 of the fourth wavelength division multiplexing/demultiplexing unit 20d, and demultiplexing of λ1, λ2, λ3, λ4 is completed. When the wavelength division multiplexer/demultiplexer is employed as a multiplexer, a wavelength division multiplexing process is opposite to the above-mentioned demultiplexing process, and the details thereof will not be described herein. The fourth wavelength division multiplexing/demultiplexing unit 20d can filter the light containing other wavelength (e.g., λ1, λ2, λ3) that may be transmitted through previous stages and to the fourth stage. Through filtering, an extinction ratio can be increased, and crosstalk of other wavelengths can be prevented from being introduced into a light channel of the wavelength λ4.

Figure 5:
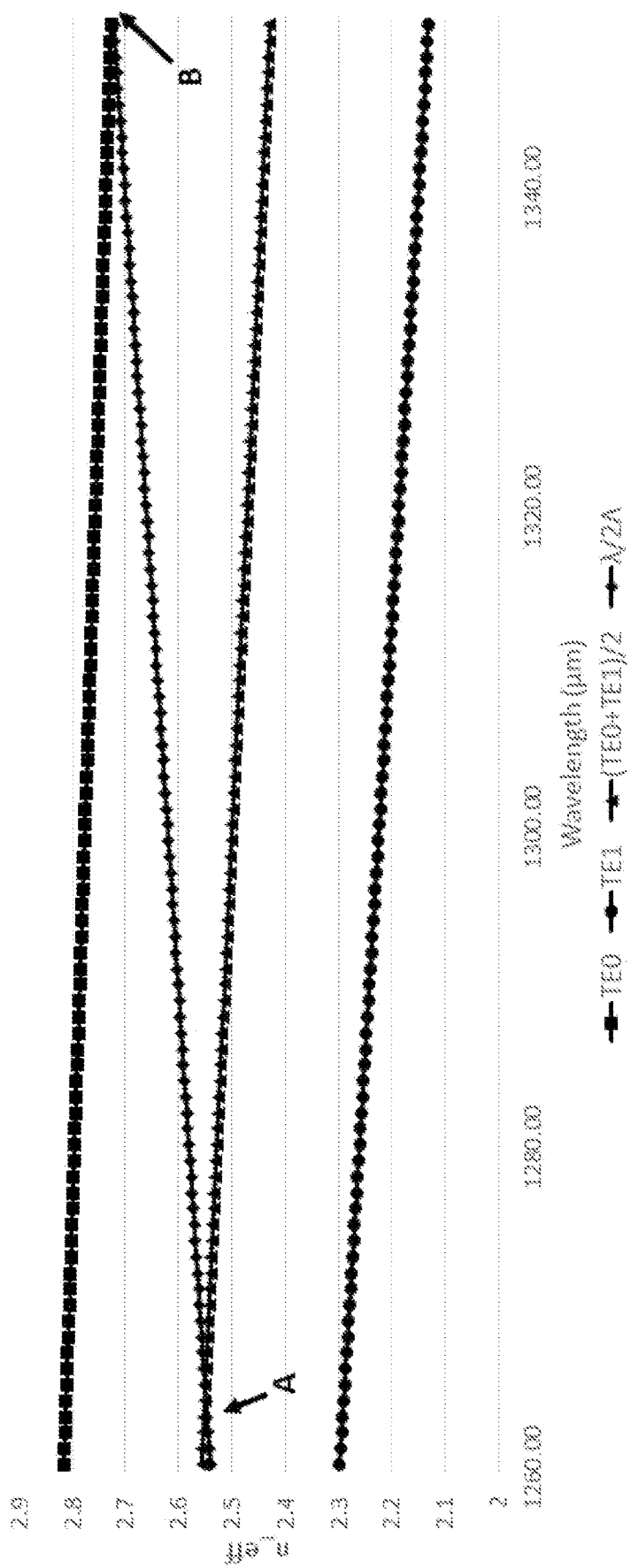
FIG. 5 is a schematic diagram showing relations of effective refractive indices of TE0, TE1, and (TE0+TE1)/2 in a strip waveguide of a silicon material, and a value of Δ/2Λ that respectively varies with a wavelength λ according to the present disclosure.

As shown in FIG. 2, the asymmetric Bragg grating 22 employed in the present disclosure is a Bragg grating that is gradually asymmetrical. Compared with a Bragg grating that is completely asymmetrical, this grating can effectively suppress occurrences of side lobes and has a high extinction ratio. The asymmetric Bragg grating 22 is designed to simultaneously realize the functions of filtering and mode conversion. When the grating period satisfies the Bragg condition $$2\pi/\Lambda = \left(\frac{2\pi}{\lambda}\right)n\_TE0 + \left(\frac{2\pi}{\lambda}\right)n\_TE,$$

the light with a wavelength λ satisfies a resonance relationship with the grating period. When the light with the wavelength λ is incident into the asymmetric Bragg grating in the TE0 mode, the asymmetric Bragg grating 22 can convert the light into the TE1 mode and reflect the light back. In the above formula, Λ is the grating period of the asymmetric Bragg grating, λ is the wavelength of a transmitted light, and nTE0 and nTE1 are respectively effective refractive indices of the light transmitted in the TE0 mode and in the TE1 mode in the asymmetric Bragg grating 22. The above formula can be simplified into λ/2Λ=(n_TE0+n_TE1)/2. That is, for one specific wavelength λ, when the grating period Λ is reasonably selected such that a value of λ/2Λ is equal to a mean value of the effective refractive indices of the TE0 mode and the TE1 mode, the conversion between the two modes can be realized. Referring to FIG. 5, relations of parameters respectively vary with the wavelength λ in a typical silicon-on-insulator (SOI) structure are illustrated, and the parameters are the effective refractive indices of the TE0 mode and the TE1 mode in the strip waveguide of the silicon material having a width of 550 nm and a height of 220 nm, the mean value of the effective refractive indices of the TE0 mode and the TE1 mode, and the value of λ/2Λ that is under one specific grating period. In the range of the CWDM4 (1261 nm to 1341 nm), a curve of the λ/2Λ and a curve of the mean value of the effective refractive indices of the TE0 mode and the TE1 mode are intersected at a point A. That is, the above equation is satisfied at the point A. The asymmetric Bragg grating of said grating period will convert the light with the wavelength corresponding to the point A between the TE0 mode and the TE1 mode, and reflect the light. In addition, the curve of λ/2Λ and a curve of the refractive index of the TE0 mode are also intersected at a point B around 1340 nm. That is, the equation λ/2Λ=n_TE0 is satisfied at the point B. When the light transmitted in the waveguide is in the TE0 mode, reflection will also occur at the wavelength corresponding to the point B. In order to prevent the crosstalk caused by the asymmetric Bragg grating reflecting a TE0 mode light with the wavelength that corresponds to the point B, it needs a large difference between the effective refractive indexes of the TE0 mode and the TE1 mode of the waveguide. In this way, the spacing between the wavelengths respectively corresponding to the point A and the point B is large enough to meet requirements of a wavelength range (>80 nm) of the CWDM4.

FIG. 5 is a curve diagram from the simulation of characteristics of the strip waveguide of the silicon material in the typical silicon-on-insulator (SOI) structure which is a reasonable design. The point B is outside the wavelength range of from 1261 nm to 1341 nm as required by the CWDM4, and crosstalk of the wavelength corresponding to the point B will not be introduced. However, in a ridge waveguide structure of silicon material of a silicon-on-insulator, or in waveguide structures of other materials (such as SiN, SiON, $SiO_2$, or lithium niobate) that have a small difference between the effective refractive indexes of the TE0 mode and the TE1 mode, wavelength spacing between the point A and the point B (<80 nm) is smaller than the wavelength spacing as required by the CWDM4, which will cause severe wavelength crosstalk and cannot meet the requirements of the wavelength division multiplexer. Therefore, the wavelength division multiplexer/demultiplexer shown in FIG. 4 is only suitable for the strip waveguide of silicon material of the silicon-on-insulator. In the strip waveguide of the silicon material, the difference between the effective refractive indexes of the TE0 mode and the TE1 mode is so large as to allow the wavelength spacing between the wavelengths respectively corresponding to the point A and the point B shown in FIG. 5 to meet the wavelength range (>80 nm) as required by the CWDM4.

Figure 6:
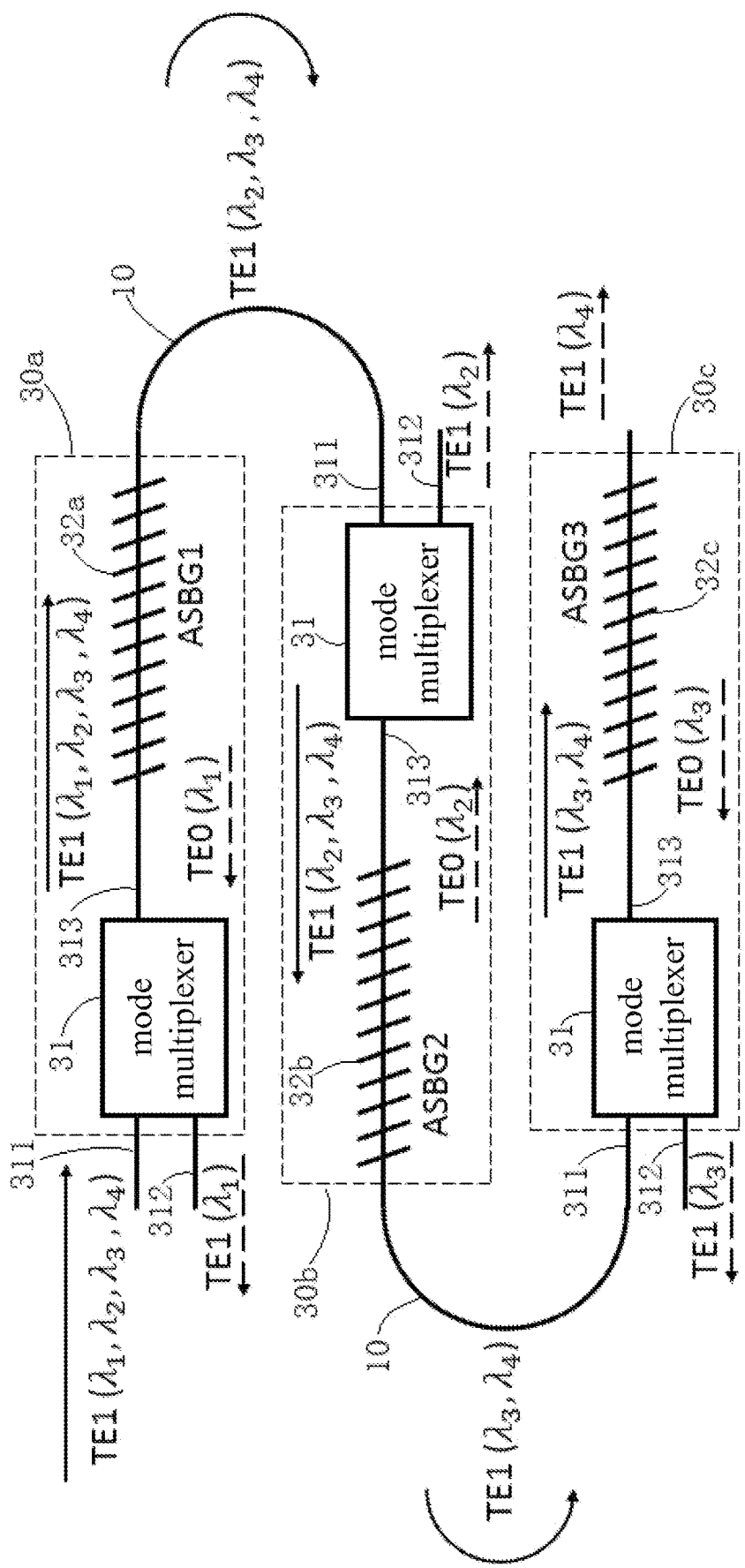
FIG. 6 is a schematic structural diagram of the four-channel wavelength division multiplexer/demultiplexer according to another embodiment of the present disclosure.

FIG. 6 illustrates another embodiment of the present disclosure. In the wavelength division multiplexer/demultiplexer of the present embodiment, the light is incident into the asymmetric Bragg grating in the TE1 mode, and the light transmitted in the asymmetric Bragg grating and the bus waveguide is mainly in the TE1 mode. As a result, a reflection peak of the TE0 mode at the point B illustrated in FIG. 5 will not appear. In addition, although there will appear a reflection peak of the TE1 mode at the wavelength corresponding to the intersection point of the curve of $\lambda/2\Lambda$ and the curve of the refractive index of the TE1 mode, the wavelength corresponding to the reflection peak of the TE1 mode is outside the wavelength range of the CWDM4 and is at shorter wavelengths, so that the wavelength division multiplexing/demultiplexing within the wavelength range as required by the CWDM4 is not affected. Moreover, modes that may be converted from the TE1 mode (such as TE2/TE3) also appear at shorter wavelengths, similarly, that will not affect the use of the wavelength division multiplexer/demultiplexer.

Specifically, as shown in FIG. 6, wavelength division multiplexing/demultiplexing of the four wavelengths in that range from 1261 nm to 1341 nm as required by the CWDM4 (which is commonly used in the light communications) is also taken as an example in the present embodiment. Assuming that the four wavelengths are $\lambda 1$, $\lambda 2$, $\lambda 3$, $\lambda 4$. The wavelength division multiplexer/demultiplexer includes three wavelength division multiplexing/demultiplexing units 30a, 30b, 30c that are sequentially cascaded. Each of the wavelength division multiplexing/demultiplexing units 30a, 30b, 30c includes the mode multiplexer 31 and the corresponding one of the asymmetric Bragg gratings 32a, 32b, 32c. The three cascaded wavelength division multiplexing/demultiplexing units are respectively the first wavelength division multiplexing/demultiplexing unit 30a, the second wavelength division multiplexing/demultiplexing unit 30b, and the third wavelength division multiplexing/demultiplexing unit 30c. The three wavelength division multiplexing/demultiplexing units respectively correspond to the first asymmetric Bragg grating 32a, the second asymmetric Bragg grating 32b, and the third asymmetric Bragg grating 32c. The asymmetric Bragg gratings of the three wavelength division multiplexing/demultiplexing units have different grating periods, and are used to respectively reflect the lights with the wavelengths $\lambda 1$, $\lambda 2$, $\lambda 3$ but transmit the light with the wavelength $\lambda 4$. The mode multiplexer 31 includes the first port 311, the second port 312, and the third port 313. The first port 311 and the second port 312 are respectively configured to input or output the optical signals, and the third port 313 is connected to the asymmetric Bragg gratings 32a, 32b, 32c. The demultiplexer is taken as an example. The first port 311 of the mode multiplexer 31 is used as the input port, the second port 312 is used as the output port, and the third port 313 is connected to the incident ends of the asymmetric Bragg gratings 32a, 32b, 32c. The transmission ends of the symmetric Bragg gratings 32a, 32b, 32c are connected to the first port 311 of the mode multiplexer 31 at a next stage. Here, the mode multiplexer 31 is designed in such a manner that the light in the TE1 mode that is input to the first port 311 will be directly transmitted through the straight-through waveguide and output from the third port 313, the light in the TE0 mode that is input to the third port 313 will be mode-coupled to the cross waveguide, and output from the second port 312 in the TE1 mode.

The demultiplexing process of the wavelength division multiplexer/demultiplexer shown in FIG. 6 is as follows. A composite light containing the four wavelengths $\lambda 1$, $\lambda 2$, $\lambda 3$, $\lambda 4$ in the TE1 mode is input to the first port 311 of the mode multiplexer 31 of the first wavelength division multiplexing/demultiplexing unit 30a, is transmitted through the straight-through waveguide of the mode multiplexer 31 and output from the third port 313, and is incident into the first asymmetric Bragg grating 32a of the first wavelength division multiplexing/demultiplexing unit 30a in the TE1 mode. The first asymmetric Bragg grating 32a is designed to transmit the light containing the wavelengths $\lambda 2$, $\lambda 3$, $\lambda 4$, and to reflect the light with the wavelength $\lambda 1$ and perform the mode conversion to convert the mode of the light reflected. The light with the wavelength $\lambda 1$ is reflected by the first asymmetric Bragg grating 32a and converted into the TE0 mode, is transmitted to the third port 313 of the mode multiplexer 31, and then is converted into the TE1 mode and output from the second port 312 after being mode coupled from the straight-through waveguide to the cross waveguide in the mode multiplexer 31. After being transmitted through the first asymmetric Bragg grating 32a, the light containing the wavelengths $\lambda 2$, $\lambda 3$, $\lambda 4$ continues to be transmitted to the second wavelength division multiplexing/demultiplexing unit 30b at a next stage along the bus waveguide 10 in the TE1 mode, and is input to the first port 311 of the mode multiplexer 31 of the second multiplexing/demultiplexing unit 30b. The second asymmetric Bragg grating 32b of the second wavelength division multiplexing/demultiplexing unit 30b is designed to transmit the light containing the wavelengths $\lambda 3$, $\lambda 4$, and to reflect the light with the wavelength $\lambda 2$ and perform the mode conversion to convert the mode of the light reflected. The demultiplexing process of the second wavelength division multiplexing/demultiplexing unit 30b is the same as that of a previous stage. The light with the wavelength λ2 will be output from the second port 312 of the mode multiplexer 31 of the second wavelength division multiplexing/demultiplexing unit 30b in the TE1 mode, and the light containing the wavelengths λ3, λ4 will continue to be transmitted to the third wavelength division multiplexing/demultiplexing unit 30c at a next stage along the bus waveguide 10 in the TE1 mode. At this stage, the third asymmetric Bragg grating 32c is designed to transmit the light with the wavelength λ4, and to reflect the light with the wavelength λ3 and perform the mode conversion to convert the mode of the light reflected. Finally, the light with the wavelength λ3 in the TE1 mode is output from the second port 312 of the mode multiplexer 31 of the third wavelength division multiplexing/demultiplexing unit 30c, and the light with the wavelength λ4 in the TE1 mode is transmitted through the third asymmetric Bragg grating 32c and output. In this way, demultiplexing of λ1, λ2, λ3, λ4 is completed. When the wavelength division multiplexer/demultiplexer is employed as a multiplexer, the wavelength division multiplexing process is opposite to the above-mentioned demultiplexing process, and the details thereof will not be described herein.

In the present embodiment, the light incident into the asymmetric Bragg grating is in the TE1 mode, so that the light transmitted in the asymmetric Bragg grating is in the TE1 mode. Accordingly, the crosstalk caused by reflection of the asymmetric Bragg grating for the TE0 mode can be prevented. In addition, the crosstalk caused by reflection peaks of the TE1 mode or higher-order modes that may exist at short wavelengths can be effectively prevented by performing reflecting and filtering light with short wavelengths first and sequentially increasing the filtered wavelengths in a cascade manner. For example, in the demultiplexing process, the order of the four wavelengths is λ1<λ2<λ3<λ4, so that the crosstalk caused by the reflection peaks of the TE1 mode or a higher-order mode at short wavelengths can be prevented. Moreover, there is no need to additionally dispose filter devices on the bus waveguides between the wavelength division multiplexing/demultiplexing units at each stage, which allows the manufacturing process to be simplified.

Figure 7:
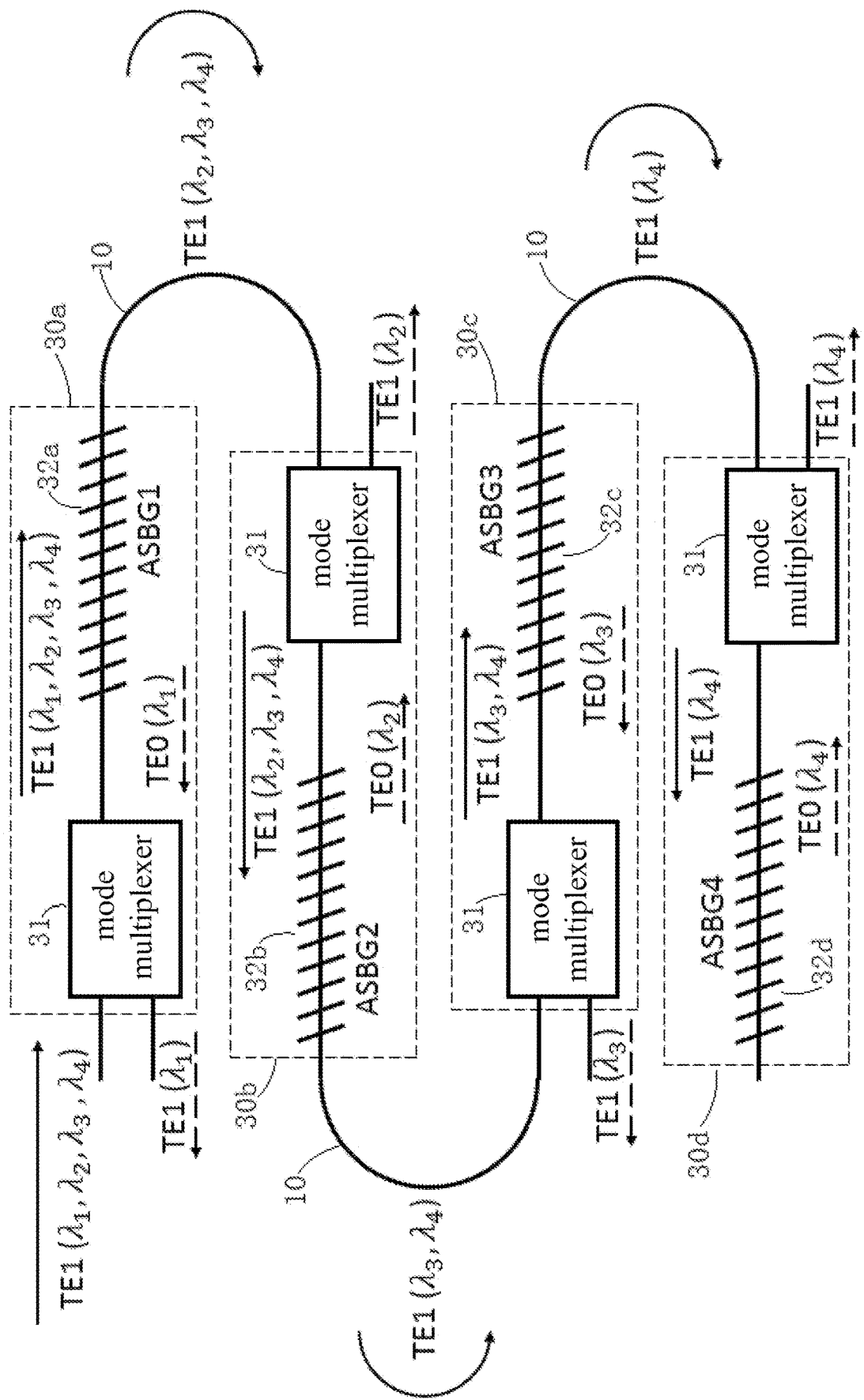
FIG. 7 is a schematic structural diagram of one modification of the wavelength division multiplexer/demultiplexer as shown in FIG. 6.

The wavelength division multiplexer/demultiplexer shown in FIG. 7, further improved on the basis of the embodiment shown in FIG. 6, a fourth wavelength division multiplexing/demultiplexing unit 30d is cascaded after the third wavelength division multiplexing/demultiplexing unit 30c. A fourth asymmetric Bragg grating 32d of the fourth wavelength division multiplexing/demultiplexing unit 30d is designed to reflect the light with the wavelength λ4 and perform the mode conversion to convert the mode of the light reflected. Finally, the light with the wavelength λ4 in the TE1 mode is output from the second port of the mode multiplexer 31 of the fourth multiplexing/demultiplexing unit 30d. The fourth wavelength division multiplexing/demultiplexing unit 30d is used to filter the light containing other wavelength (e.g., those having the wavelengths λ1, λ2, λ3) that may be transmitted through previous stages and to the fourth stage. Through filtering, the extinction ratio can be increased, and the crosstalk of other wavelengths can be prevented from being introduced into the light channel of the wavelength λ4.

Figure 8:
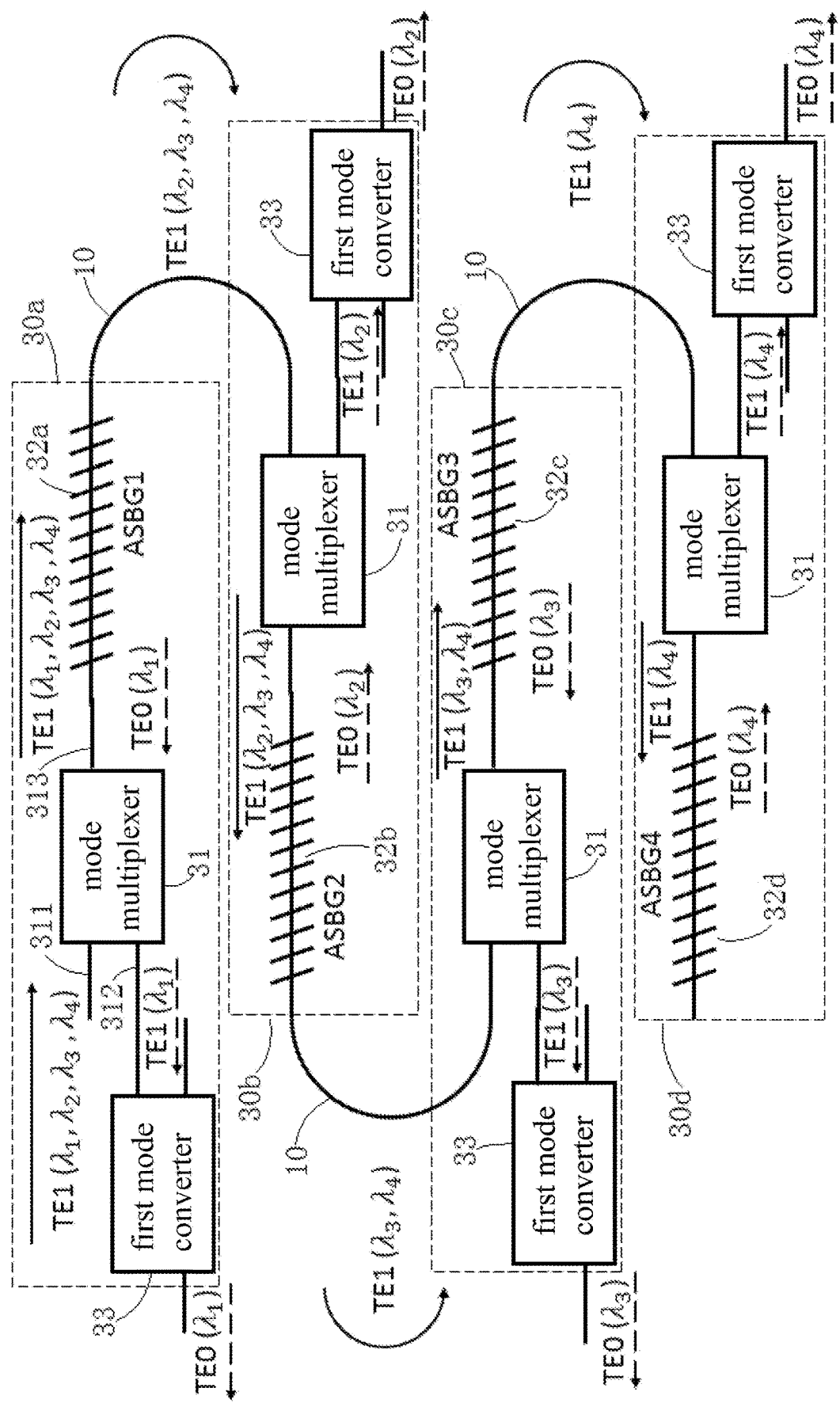
FIG. 8 is a schematic structural diagram of another modification of the wavelength division multiplexer/demultiplexer as shown in FIG. 6.

The wavelength division multiplexer/demultiplexer shown in FIG. 8, further improved on the basis of the embodiment shown in FIG. 6 or FIG. 7, a first mode converter 33 is provided to the output port of each wavelength division multiplexing/demultiplexing unit. That is, the wavelength division multiplexing/demultiplexing units 30a, 30b, 30c, 30d further include the first mode converter 33. The first mode converter 33 is connected to the second port 312 of the mode multiplexer 31. During the wavelength division multiplexing process, the first mode converters 33 of the wavelength division multiplexing/demultiplexing units 30a, 30b, 30c, 30d at each stage are respectively used to convert the light in the TE1 mode that is output from the second port 312 of the corresponding mode multiplexer 31 into the TE0 mode. In the embodiment, the structure of the first mode converter 33 is the same as that of the mode multiplexer 31, and includes a straight-through waveguide and a cross waveguide. Two ends of the straight-through waveguide are respectively the first port and the third port, and one end of the cross waveguide that is adjacent to the first port is the second port. But, the first mode converter 33 only makes use of the second port and the third port to perform the mode conversion. In other embodiments, the first mode converter 33 may also adopt other mode conversion structures.

Figure 9:
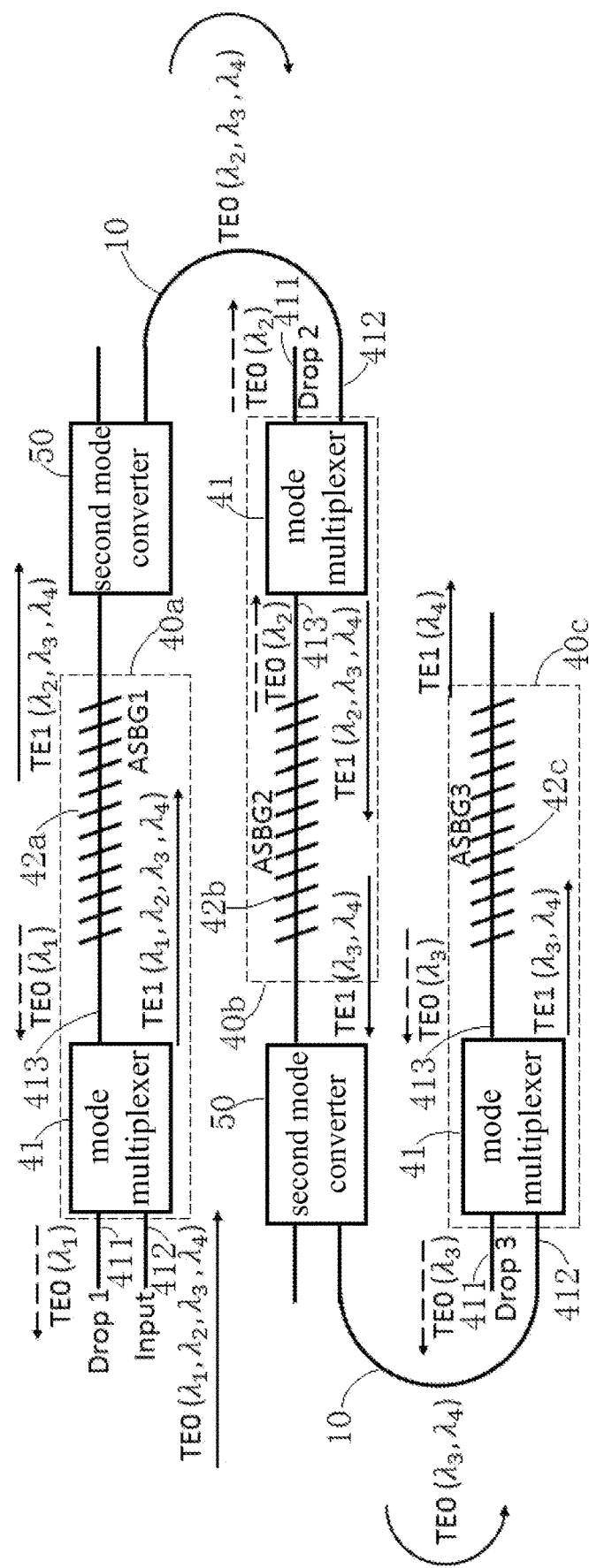
FIG. 9 is a schematic structural diagram of the four-channel wavelength division multiplexer/demultiplexer according to yet another embodiment of the present disclosure.

The embodiment shown in FIG. 9, the same as the embodiment shown in FIG. 6, both are the wavelength division multiplexer/demultiplexer used for four wavelengths. The wavelength division multiplexer/demultiplexer includes three wavelength division multiplexing/demultiplexing units that are sequentially cascaded. Wherein, each of the wavelength division multiplexing/demultiplexing units 40a, 40b, 40c includes a mode multiplexer 41 and the corresponding one of the asymmetric Bragg gratings 42a, 42b, 42c. The three cascaded wavelength division multiplexing/demultiplexing units are respectively the first wavelength division multiplexing/demultiplexing unit 40a, the second wavelength division multiplexing/demultiplexing unit 40b, and the third wavelength division multiplexing/demultiplexing unit 40c. The three wavelength division multiplexing/demultiplexing units respectively correspond to the first asymmetric Bragg grating 42a, the second asymmetric Bragg grating 42b, and the third asymmetric Bragg grating 42c. The asymmetric Bragg gratings of the three wavelength division multiplexing/demultiplexing units have different grating periods, and are used to respectively reflect the light with the wavelengths λ1, λ2, λ3 but transmit the light with the wavelength λ4. The difference between the present embodiment and the embodiment shown in FIG. 6 is as follows. In the present embodiment, the mode multiplexer 41 is designed in such a manner that the light input to the second port 412 is in the TE0 mode and converted into the TE1 mode through being mode-coupled from the cross waveguide to the straight-through waveguide and output from the third port 413. Then, the light in the TE0 mode that is input to the third port 413 will be directly transmitted through the straight-through waveguide and output from the first port 411, and the light in the TE1 mode that is input to the third port 413 will be converted into TE0 mode through being mode-coupled from the straight-through waveguide to the cross waveguide and output from the second port 412. Moreover, there is a second mode converter 50 provided between every two adjacent ones of the wavelength division multiplexing/demultiplexing units 40a, 40b, 40c. The second mode converter 50 includes two ports, and the two ports are respectively connected to the asymmetric Bragg grating 42a or 42b at a previous stage on one side of the second mode converter 50 and the second port 412 of the mode multiplexer 41 at a next stage on another side of the second mode converter 50. When the wavelength division multiplexer/demultiplexer is employed as a demultiplexer, the second port 412 of the mode multiplexer 41 of the first wavelength division multiplexer/demultiplexer unit 40a is used as an input port for receiving the composite light in the TE0 mode, the third port 413 is connected to an incident end of the first asymmetric Bragg grating 42a, a transmission end of the first asymmetric Bragg grating 42a is connected to one port of the second mode converter 50, another port of the second mode converter 50 is connected to the second port of the mode multiplexer 41 of the second wavelength division multiplexing/demultiplexing unit 40b at a next stage, and so on. The second mode converter 50 is used to convert the light transmitted through the asymmetric Bragg grating from the TE1 mode to the TE0 mode, and transmit the light to the second port 412 of the mode multiplexer 41 of the wavelength division multiplexer/demultiplexer unit at a next stage. The first port 411 of each mode multiplexer 41 and the third asymmetric Bragg grating 42c of the third wavelength division multiplexing/demultiplexing unit 40c are respectively used to output the light of the channels after demultiplexing. The structure of the second mode converter 50 is the same as that of the mode multiplexer 41, and includes a straight-through waveguide and a cross waveguide. Two ends of the straight-through waveguide are respectively the first port and the third port, and one end of the cross waveguide that is adjacent to the first port is the second port. But, the second mode converter 50 only makes use of the second port and the third port to perform the mode conversion. In other embodiments, the second mode converter 50 may also adopt other mode conversion structures.

The demultiplexing process is as follows. A composite light containing the four wavelengths $\lambda 1, \lambda 2, \lambda 3, \lambda 4$ in the TE0 mode is input to the second port 412 of the mode multiplexer 41 of the first wavelength division multiplexing/demultiplexing unit 40a, and is mode coupled from the cross wavelength to the straight-through waveguide of the mode multiplexer 41 and output from the third port 413 in the TE1 mode. The light in the TE1 mode is incident into the first asymmetrical waveguide 42a of the first wavelength division multiplexing/demultiplexing unit 40a. The first asymmetric Bragg grating 42a is designed to transmit the light containing the wavelengths $\lambda 2, \lambda 3, \lambda 4$, and to reflect the light with the wavelength $\lambda 1$ and perform the mode conversion to convert the mode of the light reflected. The light with the wavelength $\lambda 1$ is reflected by the first asymmetric Bragg grating 42a and converted into the TE0 mode, is transmitted to the third port 413 of the mode multiplexer 41, and then is output from the first port 411 after being transmitted through the straight-through waveguide of the mode multiplexer 41. After being transmitted through the first asymmetric Bragg grating 42a, the light containing the wavelengths $\lambda 2, \lambda 3, \lambda 4$ continues to be transmitted to the second mode converter 50 in the TE1 mode, then is converted into the TE0 mode by the second mode converter 50 and transmitted in the bus waveguide 10, the light in the TE0 mode is transmitted through the bus waveguide 10 and into the second wavelength division multiplexing/demultiplexing unit 40b at a next stage, and is input from the second port 412 of the mode multiplexer 41 of the second wavelength division multiplexing/demultiplexing unit 40b. The second asymmetric Bragg grating 42b of the second wavelength division multiplexing/demultiplexing unit 40b is designed to transmit the light containing the wavelengths $\lambda 3, \lambda 4$, and reflect the light with the wavelength $\lambda 2$ and perform the mode conversion to convert the mode of the light reflected. The demultiplexing process of the second wavelength division multiplexing/demultiplexing unit 40b is the same as that of a previous stage. The light with the wavelength $\lambda 2$ in the TE0 mode is output from the first port 411 of the mode multiplexer 41 of the second wavelength division multiplexing/demultiplexing unit 40b, and the light containing the wavelengths $\lambda 3, \lambda 4$ continues to be transmitted to the second mode converter 50 in the TE1 mode, then is converted into the TE0 mode by the second mode converter 50 and transmitted in the bus waveguide 10, the light in the TE0 mode is transmitted through the bus waveguide 10 and into the third wavelength division multiplexing/demultiplexing unit 40c at a next stage, and is input from the second port 412 of the mode multiplexer 41 of the third wavelength division multiplexing/demultiplexing unit 40c. At this stage, the third asymmetric Bragg grating 42c is designed to transmit the light with the wavelength $\lambda 4$, and to reflect the light with the wavelength $\lambda 3$ and perform the mode conversion to convert the mode of the light reflected. Finally, the light with the wavelength $\lambda 3$ in the TE0 mode is output from the first port 411 of the mode multiplexer 41 of the third wavelength division multiplexing/demultiplexing unit 40c, and the light with the wavelength $\lambda 4$ in the TE1 mode is transmitted through the third asymmetric Bragg grating 42c and output. In this way, demultiplexing of the four wavelengths $\lambda 1, \lambda 2, \lambda 3, \lambda 4$ is completed. When the wavelength division multiplexer/demultiplexer is used as a multiplexer, the wavelength division multiplexing process is opposite to the above-mentioned demultiplexing process, and the details thereof will not be described herein. In the structure of the present embodiment, the light transmitted in the bus waveguide 10 is still in the TE0 mode, transmission loss is small, and requirements on the size of the waveguide are few.

Figure 10:
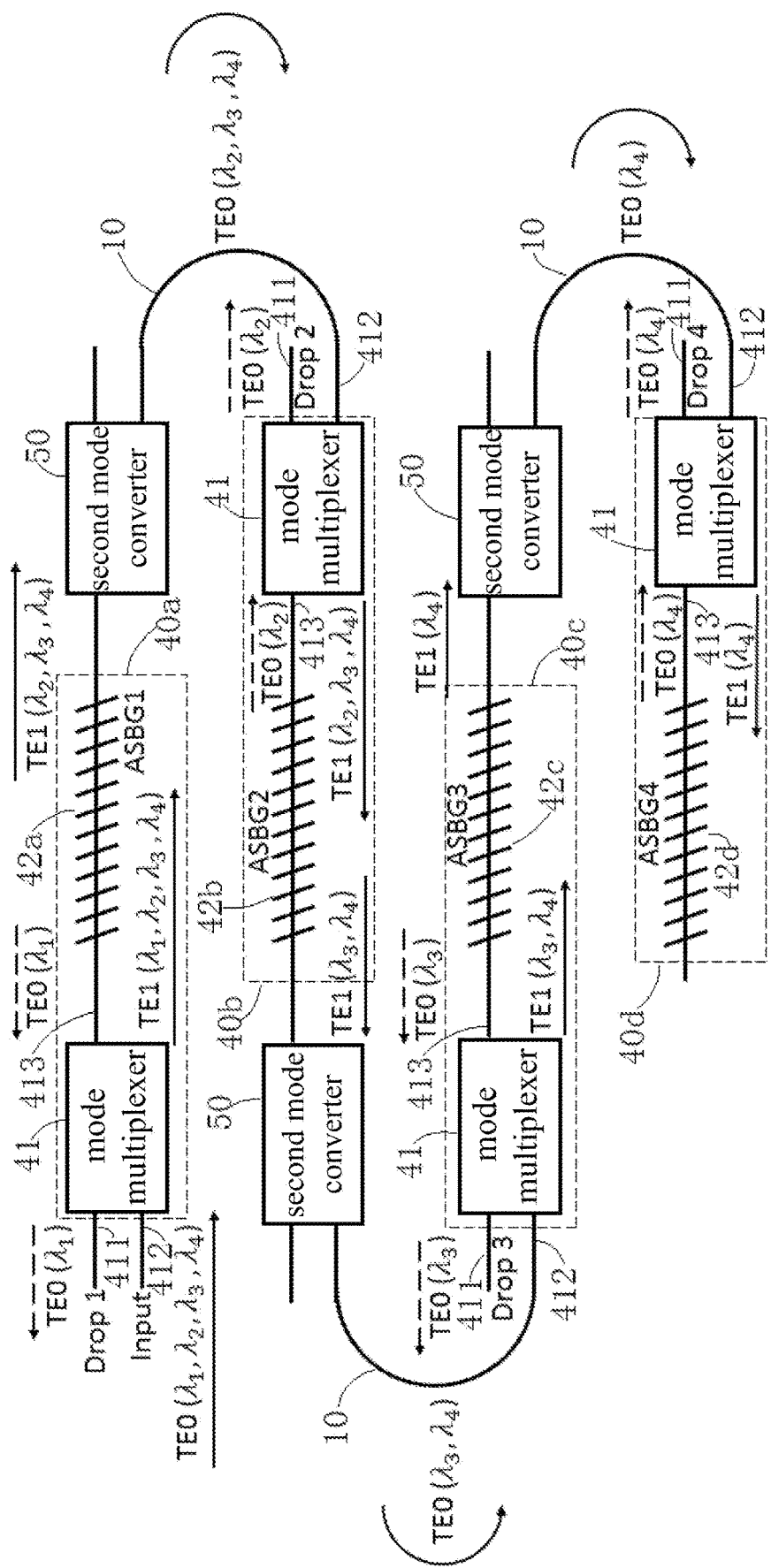
FIG. 10 is a schematic structural diagram of one modification of the wavelength division multiplexer/demultiplexer as shown in FIG. 9.

The wavelength division multiplexer/demultiplexer shown in FIG. 10, further improved on the basis of the embodiment shown in FIG. 9, a second mode converter 50 and a fourth wavelength division multiplexing/demultiplexing unit 40d are cascaded after the third wavelength division multiplexing/demultiplexing unit 40c. The light with the wavelength $\lambda 4$ in the TE1 mode is transmitted and output from the third asymmetric Bragg grating 42c of the third wavelength division multiplexing/demultiplexing unit 40c, is converted into the TE0 mode by the second mode converter 50 and transmitted along the bus waveguide 10, and then is transmitted to the fourth wavelength division multiplexing/demultiplexing unit 40d through the bus waveguide 10. The fourth asymmetric Bragg grating 42d of the fourth wavelength division multiplexing/demultiplexing unit 40d is designed to reflect the light with the wavelength $\lambda 4$ and perform the mode conversion. Finally, the light with the wavelength $\lambda 4$ is output from the first port 411 of the mode multiplexer 41 of the fourth wavelength division multiplexing/demultiplexing unit 40d in the TE0 mode. The fourth wavelength division multiplexing/demultiplexing unit 40d is used to filter the light containing other wavelengths (e.g., those having the wavelengths $\lambda 1, \lambda 2, \lambda 3$) that may be transmitted through previous stages and to the fourth stage. Through filtering, the extinction ratio can be increased, and the crosstalk of other wavelengths can be prevented from being introduced into the light channel of the wavelength $\lambda 4$.

Figure 11:
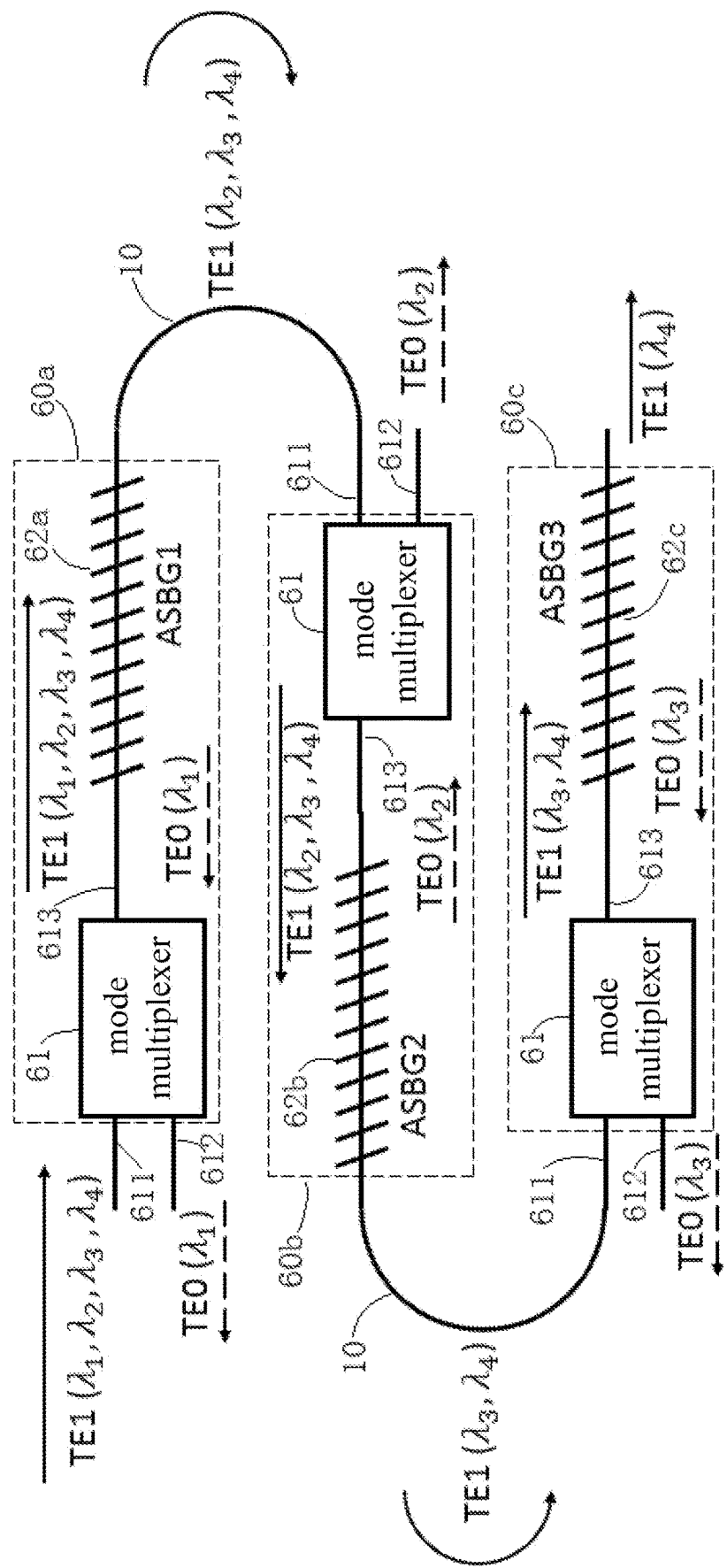
FIG. 11 is a schematic structural diagram of the four-channel wavelength division multiplexer/demultiplexer according to still another embodiment of the present disclosure.

The embodiment shown in FIG. 11, the same as the embodiment shown in FIG. 6, both are the wavelength division multiplexer/demultiplexer used for four wavelengths. The wavelength division multiplexer/demultiplexer includes three wavelength division multiplexing/demultiplexing units that are sequentially cascaded. Wherein, each of the wavelength division multiplexing/demultiplexing units 60a, 60b, 60c includes a mode multiplexer 61, and the corresponding one of the asymmetric Bragg gratings 62a, 62b, 62c. The three cascaded wavelength division multiplexing/demultiplexing units are respectively the first wavelength division multiplexing/demultiplexing unit 60a, the second wavelength division multiplexing/demultiplexing unit 60b, and the third wavelength division multiplexing/demultiplexing unit 60c. The three wavelength division multiplexing/demultiplexing units respectively correspond to the first asymmetric Bragg grating 62a, the second asymmetric Bragg grating 62b, and the third asymmetric Bragg grating 62c. The asymmetric Bragg gratings of the three wavelength division multiplexing/demultiplexing units have different grating periods, and are used to respectively reflect the light with the wavelengths $\lambda 1$, $\lambda 2$, $\lambda 3$ but transmit the light with the wavelength $\lambda 4$. The difference between the present embodiment and the embodiment shown in FIG. 6 is as follows. In the present embodiment, the first port 611 of the mode multiplexer 61 of the wavelength division multiplexing/demultiplexing unit is designed to transmit the light in the TE1 mode, and the second port 612 is used to transmit the light in TE0 mode. That is, the light that is transmitted from the first port 611 to the third port 613 of the mode multiplexer 61 is in the TE1 mode, the mode of the light is unchanged from input to output, and the light that is transmitted from the third port 613 to the second port 612 is in the TE0 mode, the mode of the light is also unchanged from input to output. For example, the light in the TE1 mode that is input to the third port 613 will be output from the first port 611 in the TE1 mode, and the light in the TE0 mode that is input to the third port 613 will be output from the second port 612 in the TE0 mode. The asymmetric Bragg gratings 62a, 62b corresponding to the wavelength division multiplexing/demultiplexing units 60a, 60b at each stage cascaded are respectively connected to the first port 611 of the first mode multiplexer 61 of the wavelength division multiplexing/demultiplexing units 60b, 60c at a next stage. When the wavelength division multiplexer/demultiplexer is employed as a demultiplexer, the first port 611 of the mode multiplexer 61 of the first wavelength division multiplexer/demultiplexer unit 60a is used as an input port for receiving the composite light in the TE1 mode. The second port 612 of the mode multiplexer 61 at each stage and the third asymmetric Bragg grating 62c of the third wavelength division multiplexing/demultiplexing unit 60c are respectively used to output the light of the channels in the TE0 mode after demultiplexing.

The demultiplexing process is as follows. A composite light containing the four wavelengths $\lambda 1$, $\lambda 2$, $\lambda 3$, $\lambda 4$ in the TE1 mode is input to the first port 611 of the mode multiplexer 61 of the first wave demultiplexing/demultiplexing unit 60a, and is transmitted through the mode multiplexer 61 and output from the third port 613 in the TE1 mode, then the light in the TE1 mode is incident into the first asymmetric Bragg grating 62a of the first wavelength division multiplexing/demultiplexing unit 60a. The first asymmetric Bragg grating 62a is designed to transmit the light containing the wavelengths $\lambda 2$, $\lambda 3$, $\lambda 4$, and to reflect the light with the wavelength $\lambda 1$ and perform the mode conversion to convert the mode of the light reflected. The light with the wavelength $\lambda 1$ is reflected by the first asymmetric Bragg grating 62a and converted into the TE0 mode, and then is transmitted to the third port 613 of the mode multiplexer 61. After passing through the mode multiplexer 61, the light with the wavelength $\lambda 1$ is output from the second port 612 in the TE0 mode. After being transmitted through the first asymmetric Bragg grating 62a, the light containing the wavelengths $\lambda 2$, $\lambda 3$, $\lambda 4$ continues to be transmitted in the bus waveguide 10 in the TE1 mode, then is transmitted to the second wavelength division multiplexing/demultiplexing unit 60b at a next stage through the bus waveguide 10, and is input to the first port 611 of the mode multiplexer 61 of the second wavelength division multiplexing/demultiplexing unit 60b. The second asymmetric Bragg grating 62b of the second wavelength division multiplexing/demultiplexing unit 60b is designed to transmit the light containing the wavelengths $\lambda 3$, $\lambda 4$, and to reflect the light with the wavelength $\lambda 2$ and perform the mode conversion. The demultiplexing process of the second wavelength division multiplexing/demultiplexing unit 60b is the same as that of the previous stage. While the light with the wavelength $\lambda 2$ is output from the second port 612 of the mode multiplexer 61 of the second wavelength division multiplexing/demultiplexing unit 60b in the TE0 mode, the light containing the wavelengths $\lambda 3$, $\lambda 4$ continues to be transmitted in the bus waveguide 10 in the TE1 mode, then is transmitted to the third wavelength division multiplexing/demultiplexing unit 60c at a next stage through the bus waveguide 10, and is input to the first port 611 of the mode multiplexer 61 of the wavelength division multiplexing/demultiplexing unit 60c. At this stage, the third asymmetric Bragg grating 62c is designed to transmit the light with the wavelength $\lambda 4$, and to reflect the light with the wavelength $\lambda 3$ and perform the mode conversion. Finally, the light with the wavelength $\lambda 3$ is output from the second port 612 of the mode multiplexer 61 of the third wavelength division multiplexing/demultiplexing unit 60c in the TE0 mode, and the light with the wavelength $\lambda 4$ in the TE1 mode is transmitted through the third asymmetric Bragg grating 62c and output. In this way, demultiplexing of the four wavelengths $\lambda 1$, $\lambda 2$, $\lambda 3$, $\lambda 4$ is completed. When the wavelength division multiplexer/demultiplexer is used as a multiplexer, the wavelength division multiplexing process is opposite to the above-mentioned demultiplexing process, and the details thereof will not be described herein.

Figure 12:
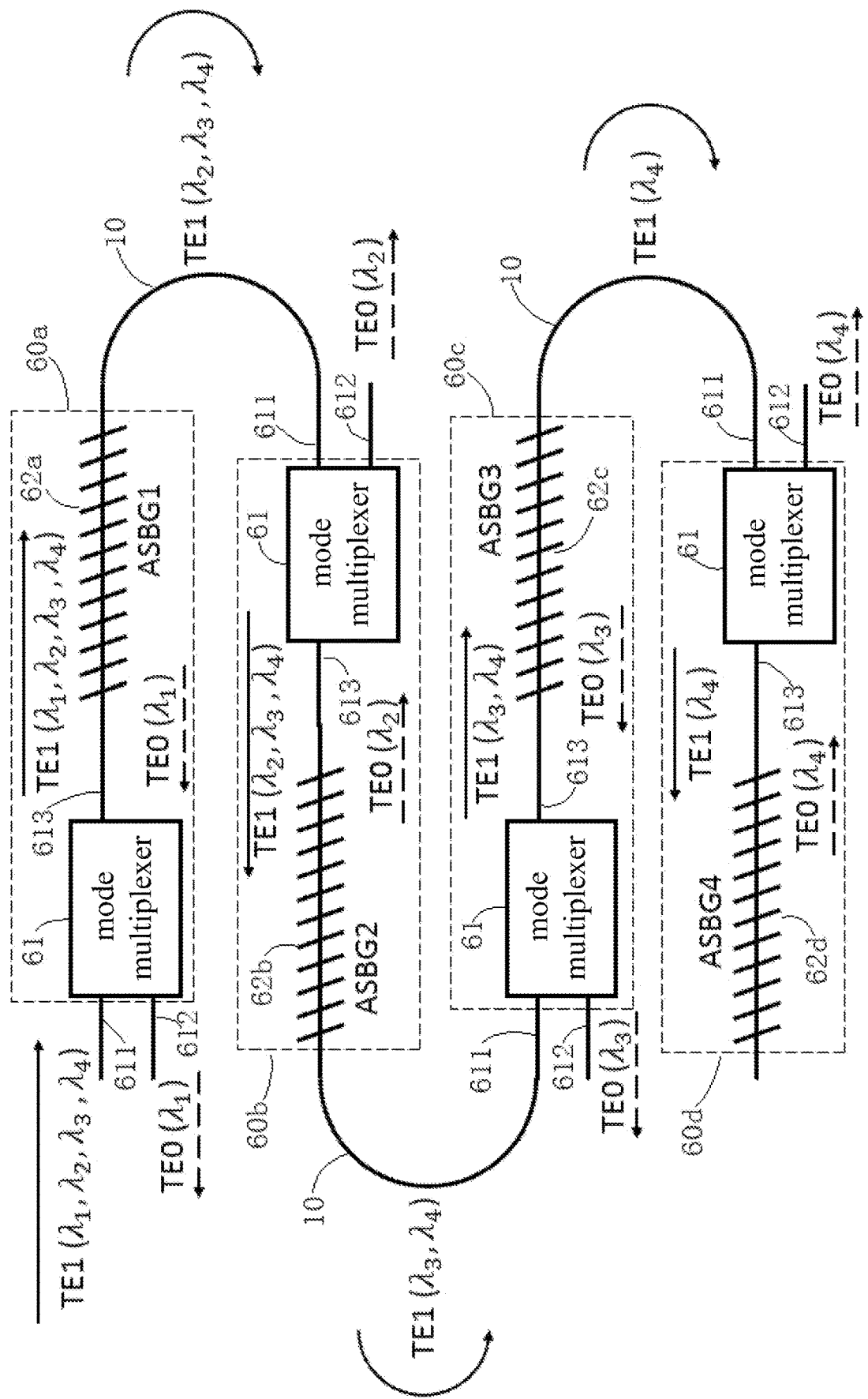
FIG. 12 is a schematic structural diagram of one modification of the wavelength division multiplexer/demultiplexer as shown in FIG. 11.

The wavelength division multiplexer/demultiplexer shown in FIG. 12, further improved on the basis of the embodiment shown in FIG. 11, a fourth wavelength division multiplexing/demultiplexing unit 60d is cascaded after the third wavelength division multiplexing/demultiplexing unit 60c. A fourth asymmetric Bragg grating 62d of the fourth wavelength division multiplexing/demultiplexing unit 60d is designed to reflect the light with the wavelength $\lambda 4$ and perform the mode conversion to convert the mode of the light reflected. Finally, the light with the wavelength $\lambda 4$ in the TE0 mode is output from the second port 612 of the mode multiplexer 61 of the fourth wavelength division multiplexing/demultiplexing unit 60d. The fourth wavelength division multiplexing/demultiplexing unit 60d is used to filter the light containing other wavelengths (e.g., those having the wavelengths $\lambda 1$, $\lambda 2$, $\lambda 3$) that may be transmitted through previous stages and to the fourth stage. Through filtering, the extinction ratio can be increased, and the crosstalk of other wavelengths can be prevented from being introduced into the light channel of the wavelength $\lambda 4$.

The above-mentioned embodiments are described by taking a wavelength division multiplexer/demultiplexer of four-wavelengths as an example. Certainly, different numbers of wavelength division multiplexing/demultiplexing units can be cascaded to realize wavelength division multiplexing/demultiplexing of different numbers of channels. Various cascading modifications are within the protection scope of the present disclosure. For example, an eight-channel wavelength division multiplexer/demultiplexer may include at least seven wavelength division multiplexing/demultiplexing units for cascading or a combination of cascading and parallel connection, so as to perform wavelength division multiplexing or demultiplexing on lights of eight different wavelengths. Naturally, the eight-channel wavelength division multiplexing/demultiplexing unit may include at least eight wavelength division multiplexing/demultiplexing units for cascading or a combination of cascading and parallel connection.

The present disclosure further provides an optical module that includes a photonic integrated chip and the wavelength division multiplexer/demultiplexer in any one of the above embodiments is disposed in the photonic integrated chip. The wavelength division multiplexer/demultiplexer is used as a wavelength division multiplexer at a light transmitting end, and is used as a wavelength division demultiplexer at a light receiving end. Naturally, optical active devices (such as signal modulators and/or photodetectors) or optical passive devices (such as couplers) can also be disposed in the photonic integrated chip.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A wavelength division multiplexer/demultiplexer, comprising:
   a substrate;
   a bus waveguide provided on the substrate; and
   at least two wavelength division multiplexing/demultiplexing units provided on the bus waveguide;
   wherein each of the at least two wavelength division multiplexing/demultiplexing units includes a mode multiplexer and an asymmetric Bragg grating, and the mode multiplexer is configured to make an input light incident into the asymmetric Bragg grating in a TE1 mode or a higher-order mode; wherein the mode multiplexer includes a first port, a second port, and a third port, the first port and the second port are configured to input or output optical signals, respectively, and the third port is connected to the asymmetric Bragg grating; wherein the asymmetric Bragg gratings in different units of the at least two wavelength division multiplexing/demultiplexing units have different grating periods;
   wherein, when the wavelength division multiplexer/demultiplexer is employed as a demultiplexer, a light containing multiple wavelengths is input to one of the first port and the second port of the mode multiplexer for passing through the mode multiplexer, so that a light in a TE(n+1) mode is output from the third port and is incident into the asymmetric Bragg grating; wherein the asymmetric Bragg grating reflects a light with a resonant wavelength λi that satisfies a resonance condition with the grating period of the asymmetric Bragg grating, and converts the mode of the reflected light with the resonant wavelength λi into a TE0 mode, and returns it to the mode multiplexer, and the reflected light is output from another one of the first port and the second port; wherein the asymmetric Bragg grating transmits light containing wavelengths other than the resonant wavelength λi, and the "n" is an integer greater than or equal to zero.

2. The wavelength division multiplexer/demultiplexer according to claim 1, wherein the resonance condition is $$2\pi/\Lambda = \left(\frac{2\pi}{\lambda i}\right) n_{TE0} + \left(\frac{2\pi}{\lambda i}\right) n_{TE1}$$

wherein the $\Lambda$ is a period of the asymmetric Bragg grating, $\lambda i$ is a wavelength of a transmitted light, and $n_{TE0}$ and $n_{TE1}$ are respectively the effective refractive indices of a light when being transmitted in the asymmetric Bragg grating in the TE0 mode and in the TE1 mode.

3. The wavelength division multiplexer/demultiplexer according to claim 1, wherein the wavelength division multiplexer/demultiplexer is a four-channel wavelength division multiplexer/demultiplexer, and the four-channel wavelength division multiplexer/demultiplexer includes a first wavelength division multiplexing/demultiplexing unit, a second wavelength division multiplexing/demultiplexing unit, and a third wavelength division multiplexing/demultiplexing unit that are sequentially cascaded;
   wherein four-channel wavelengths are respectively $\lambda 1$, $\lambda 2$, $\lambda 3$, and $\lambda 4$ that are unequal to each other, the asymmetric Bragg grating of the first wavelength division multiplexing/demultiplexing unit reflects light with the wavelength $\lambda 1$ and transmits light with the wavelengths $\lambda 2$, $\lambda 3$, $\lambda 4$, the asymmetric Bragg grating of the second wavelength division multiplexing/demultiplexing unit reflects light with the wavelength $\lambda 2$ and transmits light with the wavelengths $\lambda 3$, $\lambda 4$, and the asymmetric Bragg grating of the third wavelength division multiplexing/demultiplexing unit reflects light with the wavelength $\lambda 3$ and transmits light with the wavelength $\lambda 4$.

4. The wavelength division multiplexer/demultiplexer according to claim 3, wherein a size order of the four-channel wavelengths is: $\lambda 1 < \lambda 2 < \lambda 3 < \lambda 4$.

5. The wavelength division multiplexer/demultiplexer according to claim 3, wherein the mode multiplexer includes a straight-through waveguide and a cross waveguide, two ends of the straight-through waveguide are respectively the first port and the third port, an end of the cross waveguide that is adjacent to the first port is the second port, and the cross waveguide is mode-coupled to the straight-through waveguide.

6. The wavelength division multiplexer/demultiplexer according to claim 5, wherein the asymmetric Bragg gratings of the wavelength division multiplexing/demultiplexing units at each stage of the cascade are connected to the first port of the mode multiplexer of the wavelength division multiplexing/demultiplexing unit at a next stage;
   wherein, when the wavelength division multiplexer/demultiplexer is employed as the demultiplexer, the first port of the mode multiplexer of the first wavelength division multiplexing/demultiplexing unit is configured to receive a composite light in the TE(n+1) mode, and the second port of each of the mode multiplexers and the asymmetric Bragg grating of the third wavelength division multiplexing/demultiplexing unit are configured to output a light of each channel after the composite light is demultiplexed.

7. The wavelength division multiplexer/demultiplexer according to claim 6, wherein the wavelength division multiplexing/demultiplexing unit further includes a first mode converter, and the first mode converter is connected to the second port of the mode multiplexer; wherein, when the wavelength division multiplexer/demultiplexer is employed as the demultiplexer, the first mode converter is configured to convert a light output from the second port of the mode multiplexer from the TE(n+1) mode to the TE0 mode.

8. The wavelength division multiplexer/demultiplexer according to claim 5, wherein a second mode converter is further provided between each two adjacent ones of the wavelength division multiplexing/demultiplexing units, the second mode converter includes two ports, and the two ports are respectively connected to the asymmetric Bragg grating on one side of the second mode converter and the second port of the mode multiplexer on another side of the second mode converter;

wherein, when the wavelength division multiplexer/demultiplexer is employed as the demultiplexer, the second port of the mode multiplexer of the first wavelength division multiplexing/demultiplexing unit is configured to receive a composite light in the TE0 mode, the second mode converter is configured to convert a light transmitted through the asymmetric Bragg grating from the TE(n+1) mode to the TE0 mode and then transmit the light to the second port of the mode multiplexer of the wavelength division multiplexer/demultiplexer unit at a next stage, and the first port of each of the mode multiplexers and the asymmetric Bragg grating of the third wavelength division multiplexing/demultiplexing unit are configured to output a light of each channel after the composite light is demultiplexed.

9. The wavelength division multiplexer/demultiplexer according to claim 3, wherein the first port of the mode multiplexer is configured to transmit the light in the TE(n+1) mode, and the second port is configured to transmit a light in the TE0 mode;

wherein the asymmetric Bragg grating of the wavelength division multiplexing/demultiplexing unit at each stage is connected to the first port of the mode multiplexer of the wavelength division multiplexing/demultiplexing unit at a next stage;

wherein, when the wavelength division multiplexer/demultiplexer is employed as the demultiplexer, the first port of the mode multiplexer of the first wavelength division multiplexing/demultiplexing unit is configured to receive a composite light in the TE(n+1) mode, and the second port of each of the mode multiplexers and the asymmetric Bragg grating of the third wavelength division multiplexing/demultiplexing unit are configured to output a light of each channel after the composite light is demultiplexed.

10. The wavelength division multiplexer/demultiplexer according to claim 3, wherein the four-channel wavelength division multiplexer/demultiplexer further includes a fourth wavelength division multiplexing/demultiplexing unit that is cascaded with the third wavelength division multiplexing/demultiplexing unit;

wherein the fourth wavelength division multiplexing/demultiplexing unit includes the mode multiplexer and the asymmetric Bragg grating, and the asymmetric Bragg grating is configured to reflect the light with the wavelength $\lambda 4$.

11. The wavelength division multiplexer/demultiplexer according to claim 1, wherein the bus waveguide is a strip waveguide or a ridge waveguide;

wherein the substrate is a silicon substrate, an indium phosphide substrate, a gallium nitride substrate, or a lithium niobate ($LiNbO_3$) substrate; wherein the bus waveguide is a silicon waveguide, a silicon nitride waveguide, a silicon oxynitride waveguide, a silicon oxide waveguide, an indium phosphide waveguide, a gallium nitride waveguide, or a $LiNbO_3$ waveguide.

12. A photonic integrated chip, characterized in that the wavelength division multiplexer/demultiplexer as claimed in claim 1 is disposed in the photonic integrated chip.

13. An optical module, characterized in that the optical module includes the wavelength division multiplexer/demultiplexer as claimed in claim 1.

* * * * *